US012237108B2

(12) United States Patent
Choi et al.

(10) Patent No.: US 12,237,108 B2
(45) Date of Patent: Feb. 25, 2025

(54) POWER DUMPING DRIVER FOR MAGNETIC ACTUATOR

(71) Applicant: Smart Wires Inc., Durham, NC (US)

(72) Inventors: Wooyoung Choi, San Jose, CA (US); Abdul Rahman, Punjab (PK); Haris Ejaz, Punjab (PK)

(73) Assignee: Smart Wires Inc., Durham, NC (US)

( * ) Notice: Subject to any disclaimer, the term of this patent is extended or adjusted under 35 U.S.C. 154(b) by 295 days.

(21) Appl. No.: 17/985,543

(22) Filed: Nov. 11, 2022

(65) Prior Publication Data

US 2024/0006105 A1 Jan. 4, 2024

(30) Foreign Application Priority Data

Jun. 29, 2022 (PK) .................................... 416/2022

(51) Int. Cl.
*H01F 7/06* (2006.01)
*H01F 7/08* (2006.01)

(52) U.S. Cl.
CPC ............. *H01F 7/064* (2013.01); *H01F 7/081* (2013.01)

(58) Field of Classification Search
CPC ........ H01F 7/064; H01F 7/081; H01F 7/1811; H01F 7/1615

(Continued)

(56) References Cited

U.S. PATENT DOCUMENTS 5,781,399 A * 7/1998 Lanigan .................... E05C 3/16 361/172
5,861,746 A * 1/1999 Ensten ...................... B60T 8/36 324/207.16

(Continued)

FOREIGN PATENT DOCUMENTS

CN 101674890 A 3/2010
CN 109826661 B 7/2020
JP 2007019293 A 1/2007

OTHER PUBLICATIONS

Lee, Ill-Yeong, "Switching Response Improvement of a High Speed On/Off Solenoid Valve by Using a 3 Power Source Type Valve Driving Circuit," 2006 IEEE International Conference on Industrial Technology, 2006, pp. 1823-1828.

(Continued)

*Primary Examiner* — Kevin J Comber

(74) *Attorney, Agent, or Firm* — Womble Bond Dickinson (US) LLP

(57) ABSTRACT

A solenoid driver operable to drive a solenoid actuating a high-voltage power switch is disclosed. The solenoid driver includes a first group of semiconductor switches including a first semiconductor switch and a second semiconductor switch in series. This group is connected to a high-voltage supply line by a diode. The solenoid driver further includes a second group of semiconductor switches including a third semiconductor switch and a fourth semiconductor switch in series. This group is connected to the high-voltage supply line by a second diode. The solenoid driver further includes a common connection between the first group of semiconductor switches and the second group of semiconductor switches. A solenoid coil of the solenoid is connected between the first group of semiconductor switches and the second group of semiconductor switches at a junction between the first and second semiconductor switches and a junction between the third and fourth semiconductor switches.

20 Claims, 7 Drawing Sheets

(58) Field of Classification Search
USPC .......................................................... 361/152
See application file for complete search history.

(56) References Cited

U.S. PATENT DOCUMENTS

| | | | | |
|---|---|---|---|---|
| 5,982,605 | A * | 11/1999 | Massey ................ | H01H 47/325 361/191 |
| 6,005,763 | A * | 12/1999 | North .................... | H01F 7/1883 361/191 |
| 6,049,448 | A | 4/2000 | Lanigan et al. | |
| 6,055,148 | A * | 4/2000 | Grover .................... | H01L 25/16 361/103 |
| 6,262,620 | B1 * | 7/2001 | Jenski ................... | H01F 7/1844 327/424 |
| 9,048,775 | B2 | 6/2015 | Viele | |
| 9,331,616 | B2 | 5/2016 | Swanson | |

OTHER PUBLICATIONS

Intersil Americas LLC, "Renesas HIP4082 Data Sheet, 80V, 1.25A Peak Current H-Bridge FET Driver", FN3676, Rev 5.00, Sep. 30, 2015, pp. 1-14.

Pei, X., et al., "Fast operating moving coil actuator for a vacuum interrupter", IEEE Transactions on Energy Conversion, 2017, vol. 32, No. 3, pp. 931-940.

Texas Instruments, "Application Report SLVAE59, Using DRV to Drive Solenoids—DRV8876/DRV8702-Q1/DRV8343-Q1", Feb. 2019, pp. 1-13.

* cited by examiner

| | Transistor State | | | |
|---|---|---|---|---|
| Status | Q1 | Q2 | Q3 | Q4 |
| Passive | OFF | OFF | OFF | OFF |
| Activate | OFF | ON | ON | OFF |
| Deactivate | ON | OFF | OFF | ON |
| Hold | OFF | ON | OFF | OFF |

POWER DUMPING DRIVER FOR MAGNETIC ACTUATOR

CROSS-REFERENCE TO RELATED APPLICATIONS

This application claims the priority and benefit of Pakistan Patent Application No. 416/2022 filed on Jun. 29, 2022, the disclosure of which is incorporated herein by reference in its entirety.

TECHNICAL FIELD

Embodiments of the application relate generally to driving solenoids. More particularly, embodiments of the application relate to solenoids used for actuating vacuum interrupters that are used to switch apparatus in and out of high-voltage, electric transmission lines.

BACKGROUND

Solenoids are used to actuate many different types of switches as well as other mechanisms. For high voltage power switching, vacuum interrupters are generally used for many applications. These switches require a linear stroke of 4 mm to 20 mm typically, and this linear stroke is conveniently delivered by a solenoid driving a movable armature. In a deactivated state, the solenoid's armature is typically held in a stable position by one or more springs. In an activated state, the solenoid's armature may be held in its activated position by current in the solenoid or by the magnetic field established by permanent magnets or by some combination of the two.

FIG. 1 shows an example of a solenoid. In FIG. 1, solenoid 100 is in its deactivated condition, with a magnetic armature 120 and magnetic case 130 being separated. This condition is maintained by springs 140 in the absence of power applied to a single coil 110. To activate the solenoid 100, direct current is passed through the coil 110, inducing magnetic flux in the armature 120 and magnetic case 130, drawing them together and moving the armature 120 downward. Either by contact or by direct connection, the armature 120 moves an actuating rod 160 downward. One end or the other of the actuating rod 160 would be connected to a switch, either opening or closing contacts. When fully activated, respective faces 125 and 135 of the armature 120 and the case 130 are brought into contact, creating a relatively low reluctance magnetic circuit through the case and armature.

The activated state may be maintained by passing a current through the coil 110. Because of the low magnetic reluctance with the faces 125 and 135 in contact, less current is needed as compared to the current required to move the armature 120 to its activated position. Another way to maintain the activated state is to include permanent magnets 150 in the magnetic circuit. The strength of the permanent magnets 150 may be designed to maintain the armature 120 in its activated position in the absence of applied power. Alternatively, the permanent magnets 150 may be designed to maintain the armature 120 in its activated position only in combination with a specified current passing through the coil 110. The center rod 160 provides displacement to a mechanical switch, like a vacuum interrupter. In this case, upward for a deactivated solenoid and downward for an activated solenoid.

In powerline service, vacuum interrupters are often used to provide protection from transient voltages and currents. In this service, fast activation is accomplished by a combination of high voltage across the winding that provides the magnetic force to move the armature and high average current through that winding. Fast deactivation requires rapid neutralization or removal of the magnetic field holding the solenoid's armature in its activated state. The inductance of an activating solenoid will be the enemy of rapid changes, and the open solenoid (at the start of activation) typically has much less initial inductance than the closed solenoid (at the start of deactivation). To establish fast activation and deactivation, there is a need for circuitry that offers customized driving in different senses for different modes of operation, activation, holding and deactivation.

A standard approach to driving the solenoid coil 110 is to use an H-bridge as shown in FIG. 2. The bridge includes four transistor switches, Q1, Q2. Q3 and Q4. Two of the switches, Q1 and Q2 form a first stack, and switches Q3 and Q4 form a second stack. The bottom of the two stacks have a common connection to a reference bus, typically at ground potential. The solenoid 100 is connected between the common point between the two switches Q1, Q2 in the first stack and the common point between the two switches Q3, Q4 in the second stack. The tops of the two stacks are normally connected in common to a high voltage bus or another source of energy. The energy necessary to drive the solenoid 100 is stored in a capacitor 215, which is charged via a positive power bus 205 to a high voltage. Voltages in the range of 100 to 400 volts are typical when the solenoid activation time is critical, because the solenoid coil 110 is a combination of inductance L and resistance R. If one wishes to change the current, say from zero to 40 A, in a matter of milliseconds, the voltage required is defined by V=L*dI/dt. With a 10 mH inductance, this implies about 100 volts for a 4 ms transition time constant or 400 volts for a 1 ms transition time constant.

To activate the solenoid 100, the H-bridge would have switches Q3, the upper switch in the second stack, and Q2, the lower switch in the first stack, turned on, as illustrated in FIG. 2. The arrow in FIG. 2 indicates current flow through the coil 110, with the leftward direction representing current that activates the solenoid 100, pulling the armature face 125 and the case face 135 together.

Once activated and held, a current in the reverse direction is required to nullify the magnetic flux holding the solenoid 100 in the activated position. Deactivation current is represented in FIG. 3 by a left-to-right arrow, with switches Q1, the upper switch in the first stack, and Q4, the lower switch in the second stack, turned on. With the magnetic flux neutralized, the solenoid springs 140 force the faces 125 and 135 apart and move the armature 120 and the center rod 160 upward, changing the state of a high-power switching device connected to that center rod 160. In a case where the solenoid's activated state is maintained by a holding current, eliminating the magnetic field by discontinuing the current flow does not immediately deactivate the solenoid, because the stored magnetic energy persists via current flow through protective diodes for, typically, several milliseconds. Active reduction of that stored magnetic energy is necessary to create a fast, deactivating transition.

The current and voltage required to deactivate the solenoid 100 are normally different from the current and voltage required to activate the solenoid 100. That is partially because there is less magnetic flux in the holding condition and partially because the inductance of the coil is different because of the low reluctance magnetic circuit. Further, there may be operational requirements that demand specific values for the time to activate and the time to deactivate. The description below addresses the accommodation of the differences in drive requirements for the activation and deactivation transitions.

DETAILED DESCRIPTION

Figure 1:
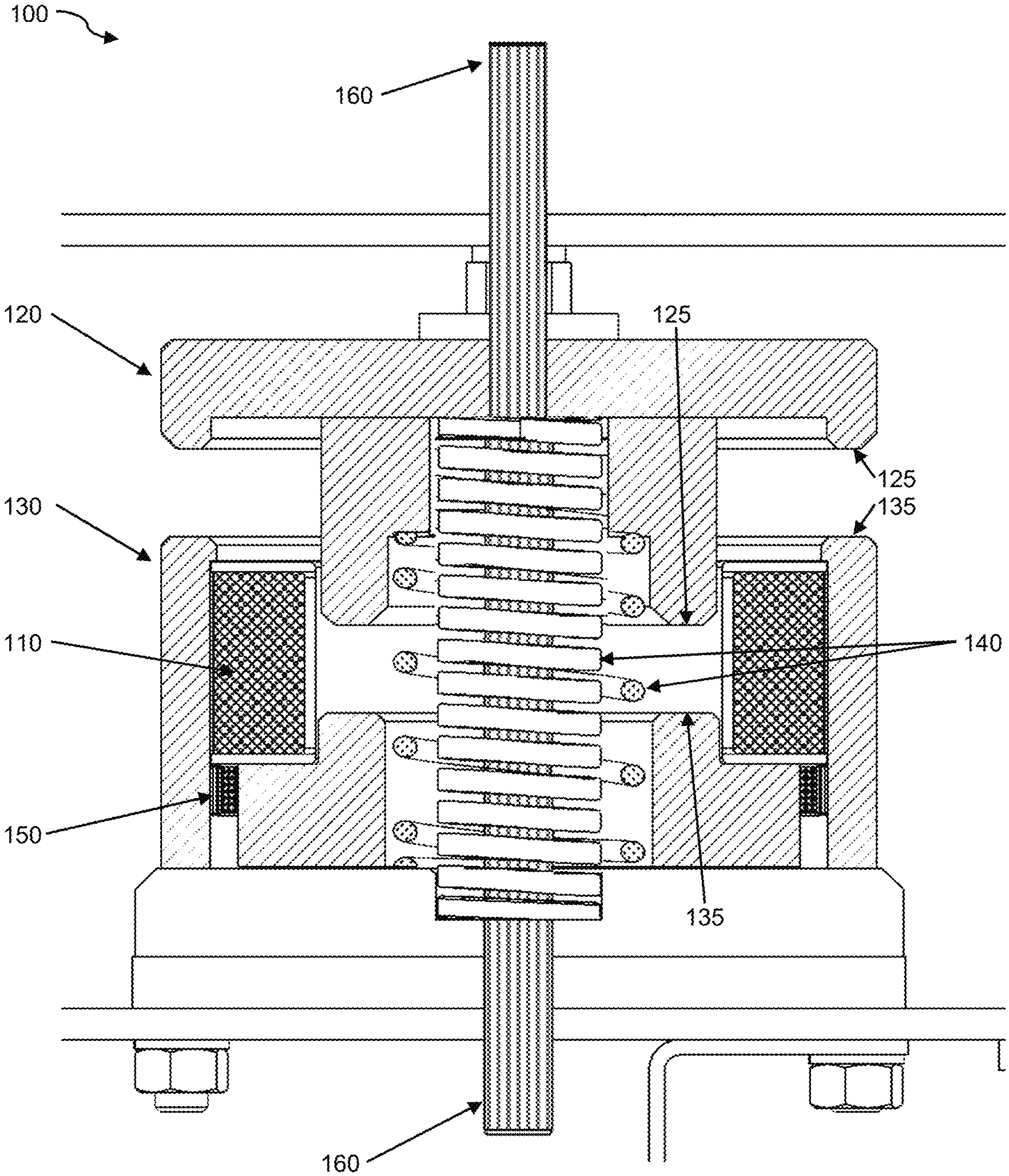
FIG. 1 (Prior Art)
FIG. 1 is a partial sectional view of a conventional single coil solenoid.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a solenoid actuated switch, such as a vacuum interrupter, frequently needs to have a rapid operation, either turning on or turning off. In the case of a single solenoid actuator, fast activation requires a high applied voltage to achieve a large dI/dt. Similarly, once activated, the switch is held in position by the magnetic flux in the solenoid, existing either because of holding current or permanent magnets. For fast deactivation, the stored magnetic flux must be reduced to a low value quickly, requiring a high dI/dt in the opposite sense. These requirements are optimally satisfied by using a four-switch H-bridge with isolated switch stacks that deliver energy stored in turn-on and turn-off capacitors, one integrated into each switch stack. The same bridge allows for application of a holding current.

According to one aspect, a solenoid driver operable to drive a solenoid actuating a high-voltage power switch is provided. The solenoid driver includes a first group of semiconductor switches including a first semiconductor switch and a second semiconductor switch in series. The solenoid driver further includes a second group of semiconductor switches including a third semiconductor switch and a fourth semiconductor switch in series. The solenoid driver further includes a first diode in series with the first group of semiconductor switches. The first diode delivers current to the first group of semiconductor switches from a power bus, and provides isolation between the power bus and the first group of semiconductor switches. The solenoid driver further includes a second diode in series with the second group of semiconductor switches. The second diode delivers current to the second group of semiconductor switches from the power bus, and provides isolation between the power bus and the second group of semiconductor switches. The solenoid driver further includes a common connection between the first group of semiconductor switches and the second group of semiconductor switches. A solenoid coil of the solenoid is connected between the first group of semiconductor switches and the second group of semiconductor switches at a junction between the first and second semiconductor switches and a junction between the third and fourth semiconductor switches. When the second and third semiconductor switches are on, activating current flows through the solenoid coil to activate the solenoid. When the first and fourth semiconductor switches are on, deactivating current flows through the solenoid coil to deactivate the solenoid.

According to another aspect, a solenoid driver operable to drive a solenoid actuating a high-voltage power switch is provided. The solenoid driver includes a first group of semiconductor switches including a first semiconductor switch and a second semiconductor switch in series. The solenoid driver further includes a second group of semiconductor switches including a third semiconductor switch and a fourth semiconductor switch in series. The solenoid driver further includes a common connection between the first group of semiconductor switches and the second group of semiconductor switches. The solenoid driver further includes a first diode in series with the first group of semiconductor switches. The first diode is connected to a first power supply for deactivation of a solenoid coil of the solenoid and configured to deliver current to the first group of semiconductor switches from the first power supply. The solenoid driver further includes a second diode in series with the second group of semiconductor switches. The second diode is connected to a second power supply for activation of the solenoid coil and configured to deliver current to the second group of semiconductor switches from the second power supply. The solenoid coil is connected between the first group of semiconductor switches and the second group of semiconductor switches at a junction between the first and second semiconductor switches and a junction between the third and fourth semiconductor switches. When the second and third semiconductor switches are on, activating current flows through the solenoid coil to activate the solenoid. When the first and fourth semiconductor switches are on, deactivating current flows through the solenoid coil to deactivate the solenoid.

Figure 2:
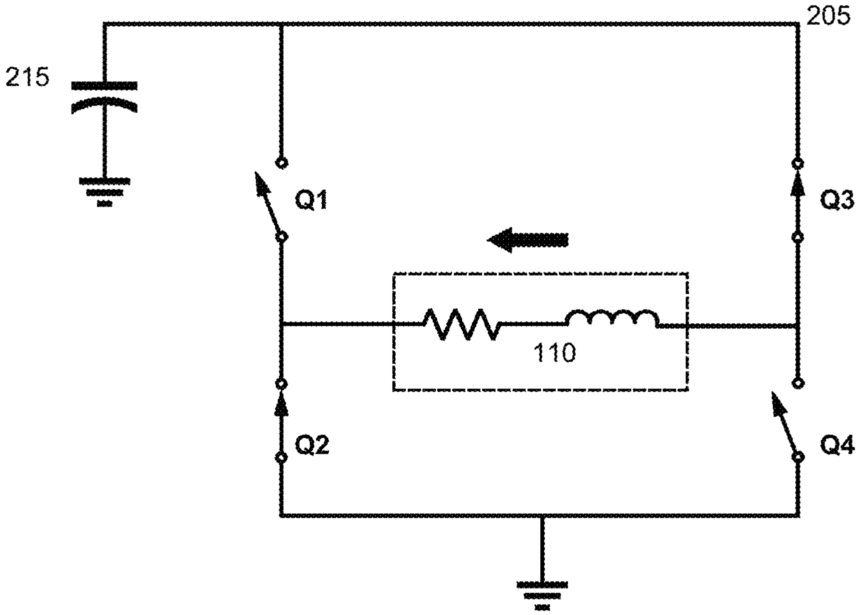
FIG. 2 (Prior Art)
FIG. 2 is a diagram of a conventional H-bridge, engaged to activate a solenoid.
Figure 3:
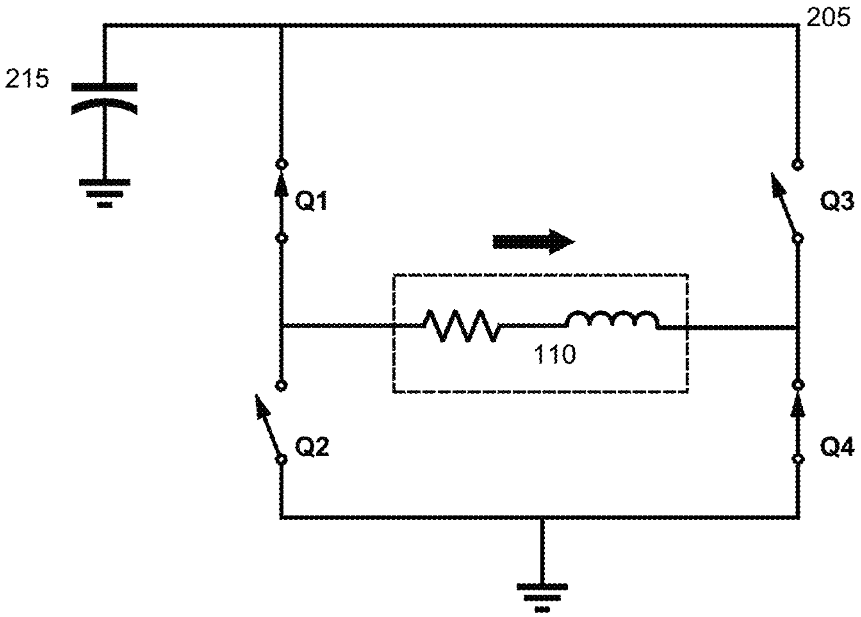
FIG. 3 (Prior Art)
FIG. 3 is a diagram of the conventional H-bridge, engaged to deactivate the solenoid.

The underlying premise is that a single coil solenoid 100 requires high current and high voltage to effect a rapid transition to the activated state. Once in that activated state, it may be held in an activated state by a lower current in the solenoid coil 110, by the action of permanent magnets 150 in the magnetic circuit, or by some combination of reduced coil current and permanent magnetic flux. Deactivation requires either bringing the holding current to zero or offsetting the flux created by the permanent magnets 150, allowing the spring or springs 140 to return the armature 120 to its open position. The energy to deactivate the solenoid 100 is different from and normally much less than the energy to activate the solenoid. The standard H-bridge of FIG. 2 and FIG. 3 does not accommodate a difference. In an improved bridge described herein, the difference is accommodated by isolating a switch stack driving the activate transition from a switch stack driving the deactivate transition. This is illustrated in FIG. 4 and FIG. 5, where the current flow arrows follow the same convention used in FIG. 2 and FIG. 3, that is, leftward for activation and rightward for deactivation.

Figure 4:
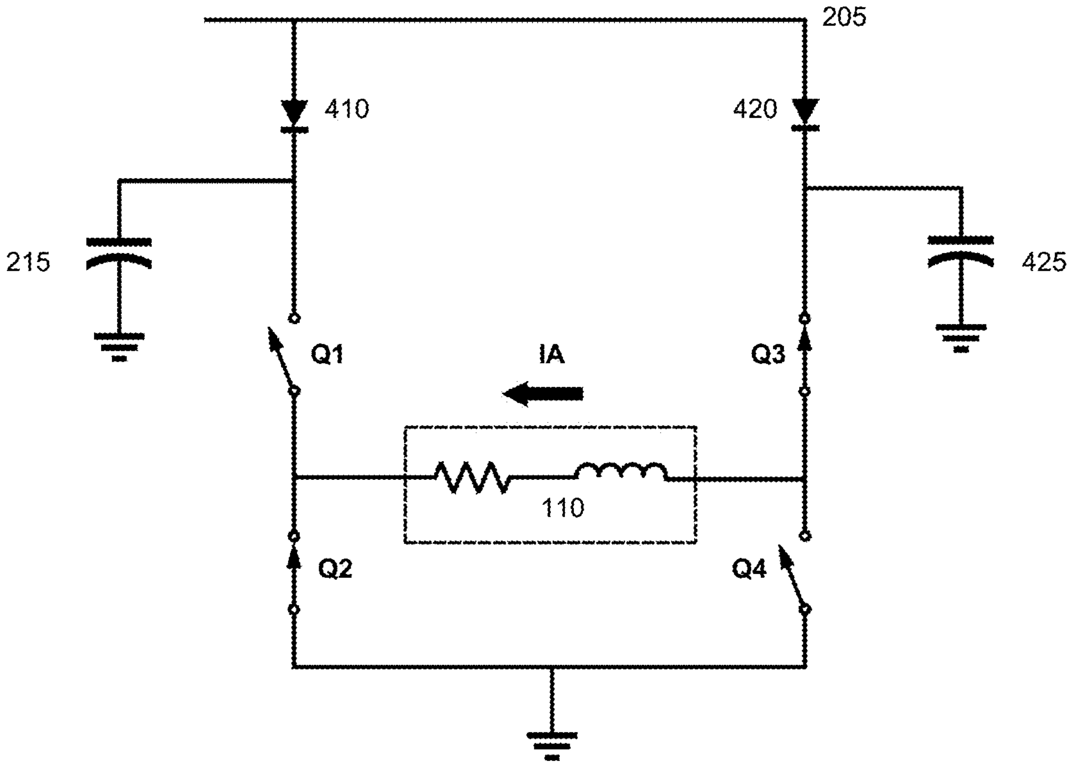
FIG. 4 is a diagram of an H-bridge with isolated switch stacks engaged to activate a solenoid according to an embodiment.

As previously described and shown in FIG. 4, the bridge is powered by a common positive bus 205, but that bus 205 can be diode isolated from the two switch stacks (i.e., switch stack Q1, Q2 and switch stack Q3, Q4) by diodes between the upper switches in each stack and the common power bus 205. Switches Q1, Q2, Q3, and Q4 may be transistor (e.g., insulated gate bipolar transistor (IGBT)) or other semiconductor switches. In some embodiments, large transient currents are necessary to operate the solenoid, so capacitors 215 and 425 are used to store the energy required to change the solenoid state. In an embodiment, diode 410, at the top of the first stack of switches, provides a unidirectional charging current path from the high voltage power bus 205 to the capacitor 215, at the top of the first stack of switches, and the stored energy in the capacitor 215 may supply current to the coil 110 for deactivation through switch Q1. In an embodiment, diode 420, at the top of the second stack of switches, provides the unidirectional charging current path from the bus 205 to the capacitor 425 at the top of the second stack of switches, and the stored energy in the capacitor 425, which is across the second stack of switches, may supply current to the coil 110 for activation through switch Q3. As indicated in FIG. 4, capacitor 425 may supply activating current IA from right to left through the solenoid coil 110, with switches Q3 and Q2 being on. When the activating current IA is flowing, the bus 205 may have an indeterminate voltage, depending on the characteristics of its powering source, but that voltage may be lower than the voltage of the charged capacitor 215, which is dedicated to deactivation. The voltage on the deactivating capacitor 215 may be unaffected during the activation cycle because of the isolating effect of diode 410.

Figure 5:
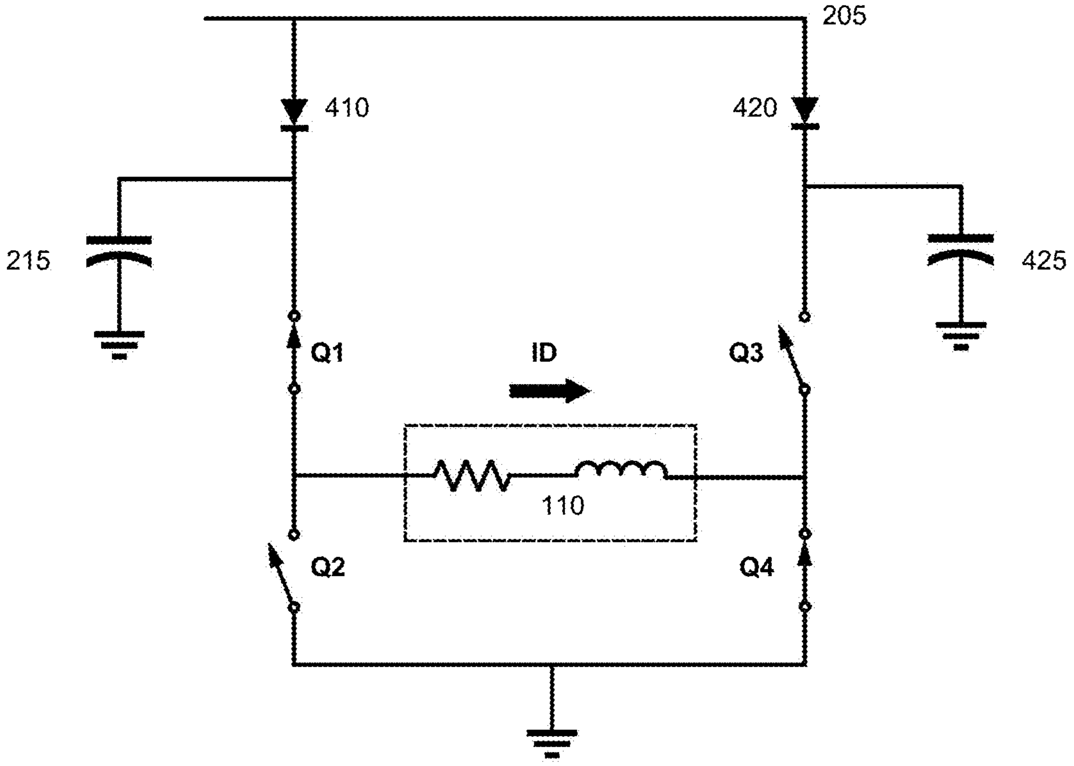
FIG. 5 is a diagram of the H-bridge with isolated switch stacks engaged to deactivate the solenoid according to an embodiment.

Referring now to FIG. 5, a deactivating current ID may be supplied via the closed switches Q1, the upper switch in the first stack, and Q4, the lower switch in the second stack. The energy required for deactivation is stored in capacitor 215, connected across the first, Q1, Q2 switch stack. Because of the isolation provided by diode 420, the energy stored in the activating capacitor 425 is unaffected during the deactivation interval.

As previously described, the voltages required to make very rapid changes in the current flowing in the coil 110 can be high. For example, with a 10 mH inductance in the coil 110, making transitions within one to a few milliseconds requires voltages in the range of 100 volts to 400 volts or more. It should be noted that simply shorting the terminals of the coil 110 to eliminate the holding current can invoke the native time constant L/R of the coil, and this number is typically a few tens of milliseconds. Further, if the holding is achieved solely by permanent magnets in the armature 120 through case 130 magnetic circuit, shorting the coil 110 may have no effect whatsoever.

In an embodiment, the capacitors 215 and 425 are sized based on the total energy required to activate and deactivate the solenoid. For example, capacitance values between 0.25 millifarad and 10 millifarads may be typical for vacuum interrupter operation, but the deactivate capacitor 215 may have a value of 1 millifarad, and the activate capacitor 425 may have a value of 4 millifarads. These values are design parameters that depend on the specific characteristics of the solenoid coil 110, and the parameters depend on the desired transition times.

Figure 6:
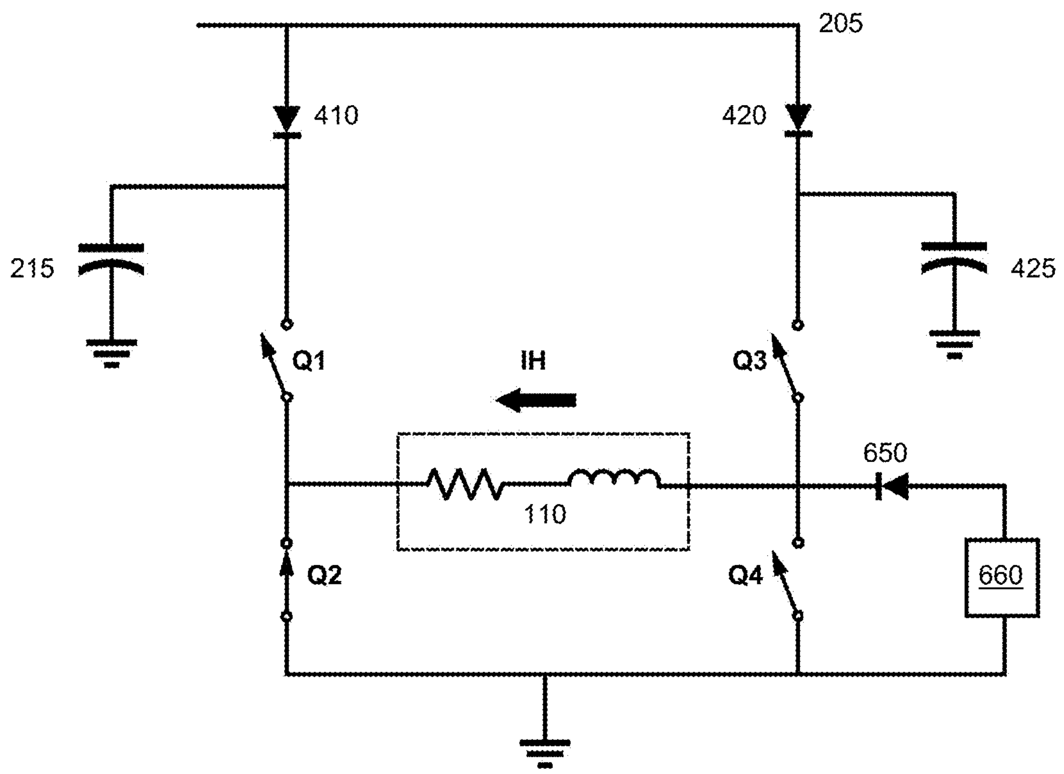
FIG. 6 is a diagram of an H-bridge with isolated switch stacks and a holding current source engaged to hold the solenoid in its activated condition according to an embodiment.

FIG. 6 is a diagram of an H-bridge with isolated switch stacks and a holding current source engaged to hold the solenoid in its activated condition according to an embodiment. Referring to FIG. 6, in an embodiment, for a solenoid actuator that depends on current flow IH through the coil 110 to hold the armature 120 in its activated position, a holding power source 660 may be required. The holding power source 660 may be integrated with the activation and deactivation circuitry as shown in FIG. 6, with the holding current line connected to the coil 110 at the junctions of switches Q3 and Q4 in the second switch stack. The holding power source 660 is isolated from the balance of the circuitry by a diode 650. The series combination of diode 650 and holding power source 660 are connected across switch Q4, which is OFF during activation and holding. This connection places the holding isolation diode 650 in electrical contact with one end of the solenoid coil 110. Under holding conditions, switch Q2 in the first switch stack is closed, providing a current path to the common, grounded end of the H bridge.

The holding power source 660 may incorporate current regulation, which assures a given level of magnetic induction from the coil 110. The resistance R of the coil 110 varies with the ambient temperature, and if the holding power source is voltage regulated, the holding current may diminish at higher temperatures. This problem is mitigated by using current regulation in the holding power source 660. A holding current may be guided through the solenoid coil 110 by holding switch Q2 in the ON condition, while switches Q1, Q3, and Q4 are in their OFF conditions.

Figure 7:
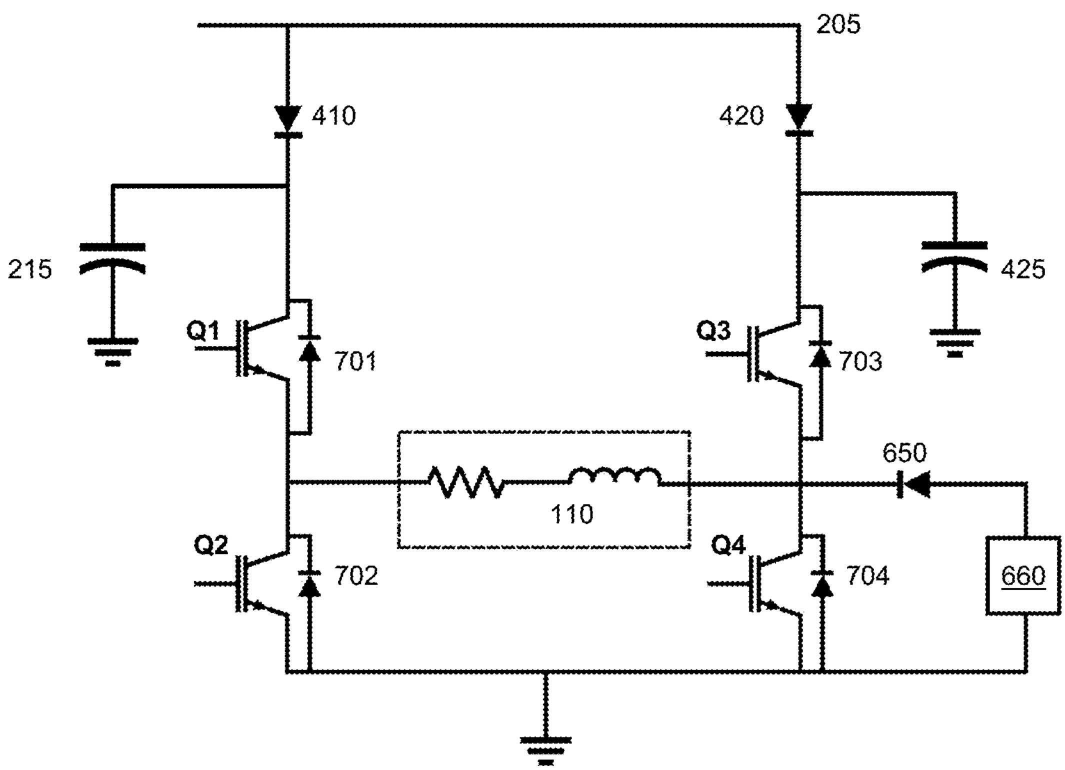
FIG. 7 is a schematic diagram of an H-bridge with isolated switch stacks and a holding current source using insulated gate bipolar transistors as switch elements according to an embodiment.

Thus far, the operating switches Q1, Q2, Q3 and Q4 have been represented by schematic switches, to make the current paths clear. In FIG. 7, which is a schematic diagram of an H-bridge with isolated switch stacks and a holding current source using insulated gate bipolar transistors (IGBTs) as switch elements according to an embodiment, the schematic shows that the switches Q1, Q2, Q3 and Q4 may be realized as IGBTs. Because the overall H-bridge is driving an inductive element, for example coil 110, each transistor switch (e.g., IGBT) is paralleled by a protective diode. These protective diodes are labeled as 701, 702, 703 and 704 in FIG. 7. As previously described, the solenoid coil 110 is schematically represented by an inductor L and a resistor R, and the system is powered by positive supply bus 205. The holding current circuitry, diode 650 and current or voltage regulated supply 660 may be optional, required only for solenoids requiring holding current.

Figures 8, 9:
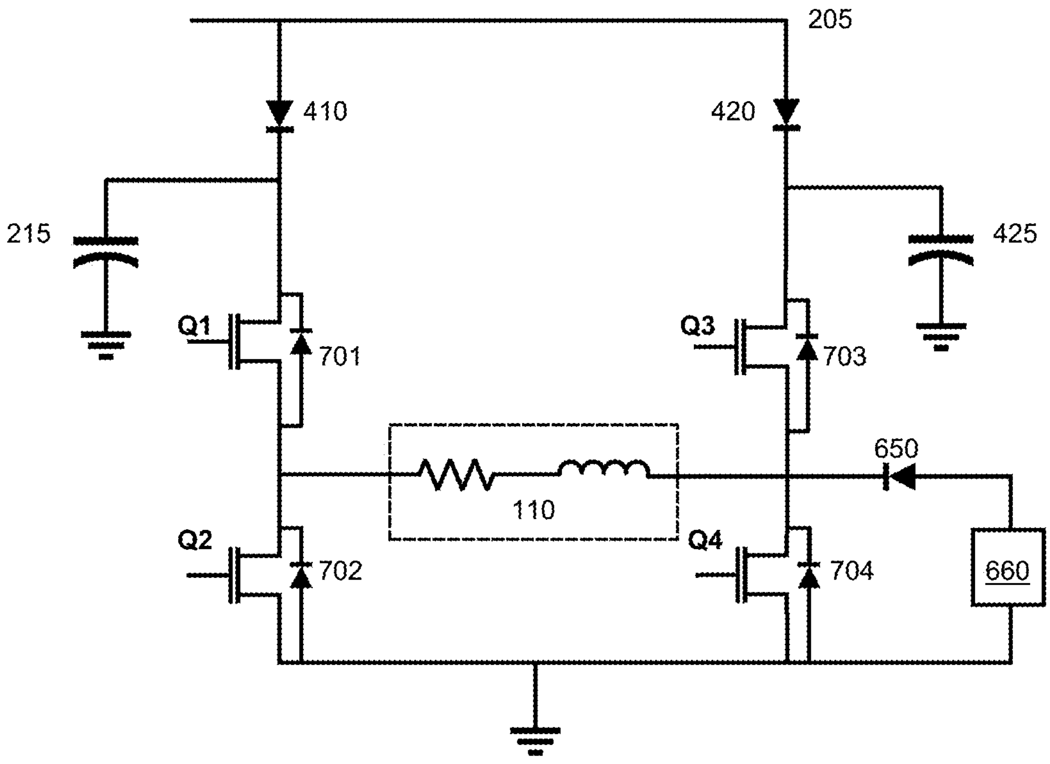
FIG. 8 is a schematic diagram of an H-bridge with isolated switch stacks and a holding current source using field effect transistors as switch elements according to an embodiment.
FIG. 9 is a table summarizing transistor states for four operating conditions of the H-bridge.

FIG. 8 is a schematic diagram of an H-bridge with isolated switch stacks and a holding current source using field effect transistors as switch elements according to an embodiment. In FIG. 8, transistor switches Q1, Q2, Q3 and Q4 may be realized by field effect transistors (typically MOSFETs). As with the IGBT realization, each of the switching transistors is paralleled by a protective diode 701, 702, 703 or 704.

FIG. 9 is a table summarizing transistor states for four operating conditions of the H-bridge. In FIG. 9, available states of the H-bridge is illustrated. Note that when the transistor switches Q1-Q4 are OFF, the bridge is in a passive state, providing no current to a solenoid coil (e.g., coil 110). All of the other transistor states have been illustrated in FIG. 4 (Activate), FIG. 5 (Deactivate) and FIG. 6 (Hold).

Figure 10:
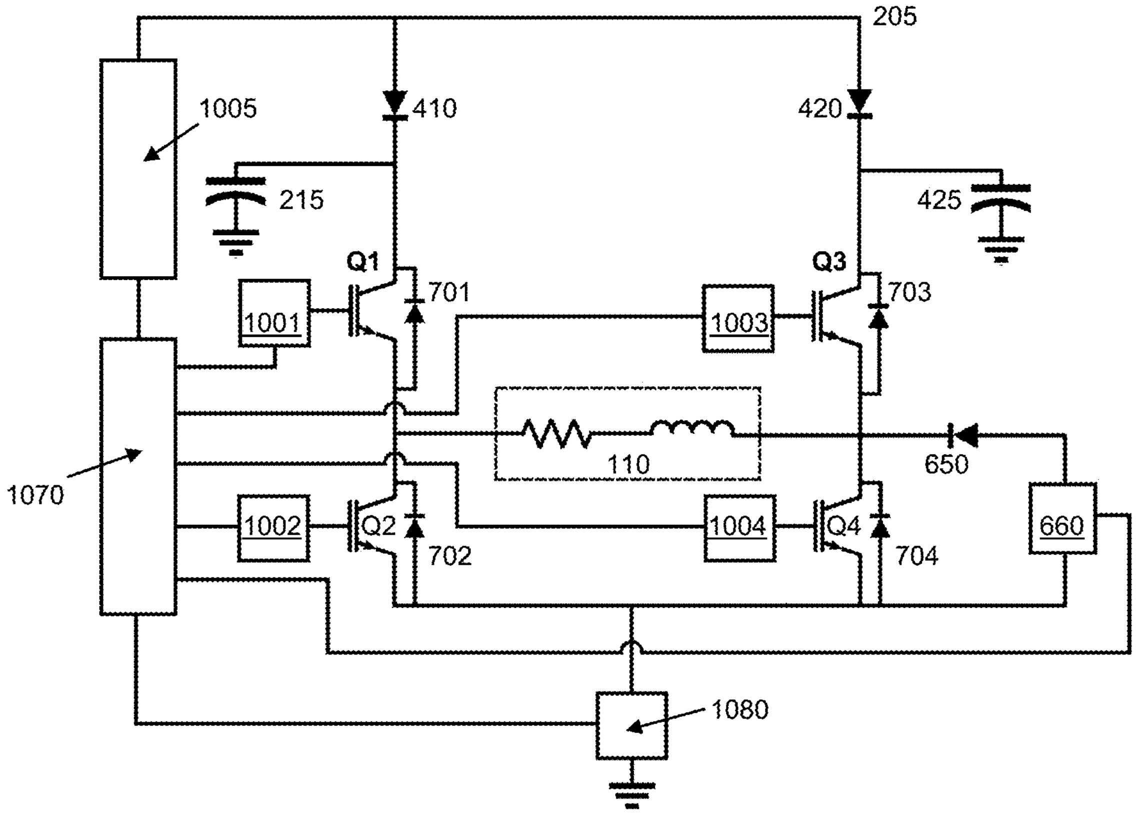
FIG. 10 is a block diagram of a control system for an H-bridge with isolated switch stacks, including a current monitor for pulse width modulation and a holding current source according to an embodiment.

FIG. 10 is a block diagram of a control system for an H-bridge with isolated switch stacks, including a current monitor for pulse width modulation and a holding current source according to an embodiment. Referring to FIG. 10, positive power bus 205 is driven by a voltage-regulated, high-voltage supply 1005. The role of supply 1005 is to charge the capacitors 215 (deactivate) and 425 (activate) to a specified high voltage. In some embodiments, the operating power source (not shown) provides power at an intermediate voltage, which may be defined by the overall system design. The high-voltage supply 1005 may boost this intermediate voltage to a desired voltage for operating the solenoid coil (e.g., coil 110). This voltage may be in the range of 100 to 800 volts, for example, and it may be generated by any standard power supply design, like voltage multipliers, bridge rectifiers, choppers and transformers or "fly-back" voltage boosters. Such power supplies are commercially available as complete supplies or as components. These supplies may deliver currents that are low compared to the currents used for changing the conditions of the solenoid, but they are suited to charging the capacitors 215 and 425 over a period of 1 to 100 seconds, as an example.

In an embodiment, driver control system 1070 is connected to a master control (not shown) that defines the operation of the solenoid according to overall system needs. The driver control system 1070 supplies the signals described in FIG. 9 to establish the ON and OFF conditions of the transistor switches Q1, Q2, Q3 and Q4. Each of the transistor switches Q1-Q4 is referenced to a particular voltage level, so each has a driver circuit, for example driver circuit 1001 for Q1, driver circuit 1002 for Q2, driver circuit 1003 for Q3 and driver circuit 1004 for Q4, that drives each transistor to correct voltages for their ON and OFF conditions, including level shifting as necessary.

The driver control system 1070 may also be used to turn the power supplies 1005 and 660 on and off, according to system needs. Note that holding power supply 660 may operate at a much lower voltage than the supply 1005. If voltage of power supply 660 is lower than that of the operating power source, it may employ a "buck" power supply, using choppers and inductors to supply a regulated current at high efficiency. Even though holding power supply 660 can be current regulated, its compliance voltage is low enough that it may play no role in the activation of the solenoid coil, during which time the supply 660 is isolated from the high voltage on the solenoid coil by diode 650.

In an embodiment, an optional functionality is supported by a current monitor 1080, connected between the power system ground and the common low end of the first and second switch stacks. The current monitor may be configured to sense a maximum allowable coil current ($I_{MAX}$), and interrupt current delivery to the solenoid coil when current through the solenoid coil reaches the maximum allowable coil current. For the fastest switching of the solenoid, the capacitors 215 and 425 may be charged to voltages that are so high they could destroy the winding of the solenoid coil if they were applied on a constant basis. To provide the highest safe switching speed, pulse width modulation (PWM) may be applied to the signals that control the current switches. In an embodiment, the current monitor 1080 signals the driver control system 1070 when the current through the solenoid coil reaches the maximum allowable coil current $I_{MAX}$, and the driver control system 1070 switches the active transistor switch, Q3 (activate) or Q1 (deactivate), OFF, allowing the current in the solenoid coil to decay until the active transistor switch is once again turned on. Resumption of active driving may be determined by a clock transition or by an interval timer. The diode 704 provides a current bypass when the transistor switch Q3 is turned OFF, and the diode 702 provides a current bypass when the transistor switch Q1 is turned OFF. In some embodiments, the use of current monitoring and pulse width modulation of the switching signals may be confined to the activate cycle.

Figure 11:
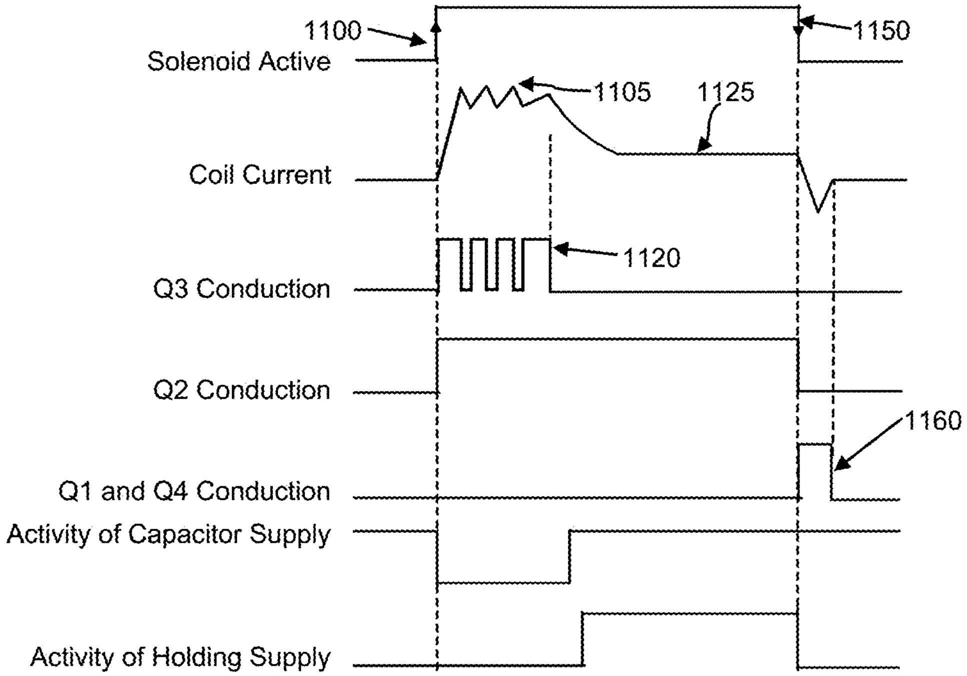
FIG. 11 is a diagram of illustrative waveforms for the control of activating and deactivating a solenoid using the system described in FIG. 10.

FIG. 11 is a diagram of illustrative waveforms for the control of activating and deactivating a solenoid using the system described in FIG. 10. In FIG. 11, a time-line representation of the signals that control the bridge driver is shown. The first diagram shows an interval when the solenoid is activated, starting at time 1100. The activation is done by the current flowing in the coil, and in this case, the current illustrates the effect of using pulse width modulation driving, rising to a peak $I_{MAX}$ 1105, then relaxing to a lower value during the time that the driving switch transistor Q3 is OFF. The Q3 conduction follows the PWM driving signal delivered from the driver control system 1070 via the driver circuit 1003. The activating signal delivered via Q3 continues until the solenoid is in its fully engaged condition; referring to FIG. 1, that is when the armature faces 125 are in contact with the case faces 135; this occurs at time 1120. Various methods exist for defining that condition, including a timed interval or a position sensor. During the entire time that the solenoid is to be activated, time 1100 to time 1150, transistor switch Q2 remains ON. The holding power supply 660 may be turned on at the conclusion of the coil drive Q3 switch activation 1120. When the activation coil current abates to the holding current level 1125, current flows from the holding supply 660 via the isolating diode 650.

When the solenoid is to be deactivated, indicated here at time 1150, the holding current supply 660 is turned off, and the transistor switches Q1 and Q4 are turned ON. This allows current from the deactivation capacitor 215 to counteract the holding current and/or the holding magnetic field, allowing the springs 140 to separate the armature 120 from the case 130 and change state of the contactor or interrupter connected to the activating shaft 160. The deactivation current is allowed to flow through switches Q1 and Q4 for a length of time, from time 1150 to time 1160.

In general, the high-voltage supply 1005 may be allowed to operate continuously to maintain a high voltage on both the deactivating capacitor 215 and activating capacitor 425. Depending on the supply compliance, it may be turned off during the time interval from time 1100 to time 1120, when extremely large currents are being passed through switches Q3 and Q2 and the solenoid coil 110.

Isolating the two sides of H-bridge, as shown in FIGS. 4, 5, 6, 7, 8, and 10, may provide a system designer flexibility to provide different energies for activating and deactivating the solenoid by selecting different sizes for the activating capacitor 425 and the deactivating capacitor 215. Further flexibility can be provided by separating the power bus 205 into two power buses, as shown in FIG. 12.

Figure 12:
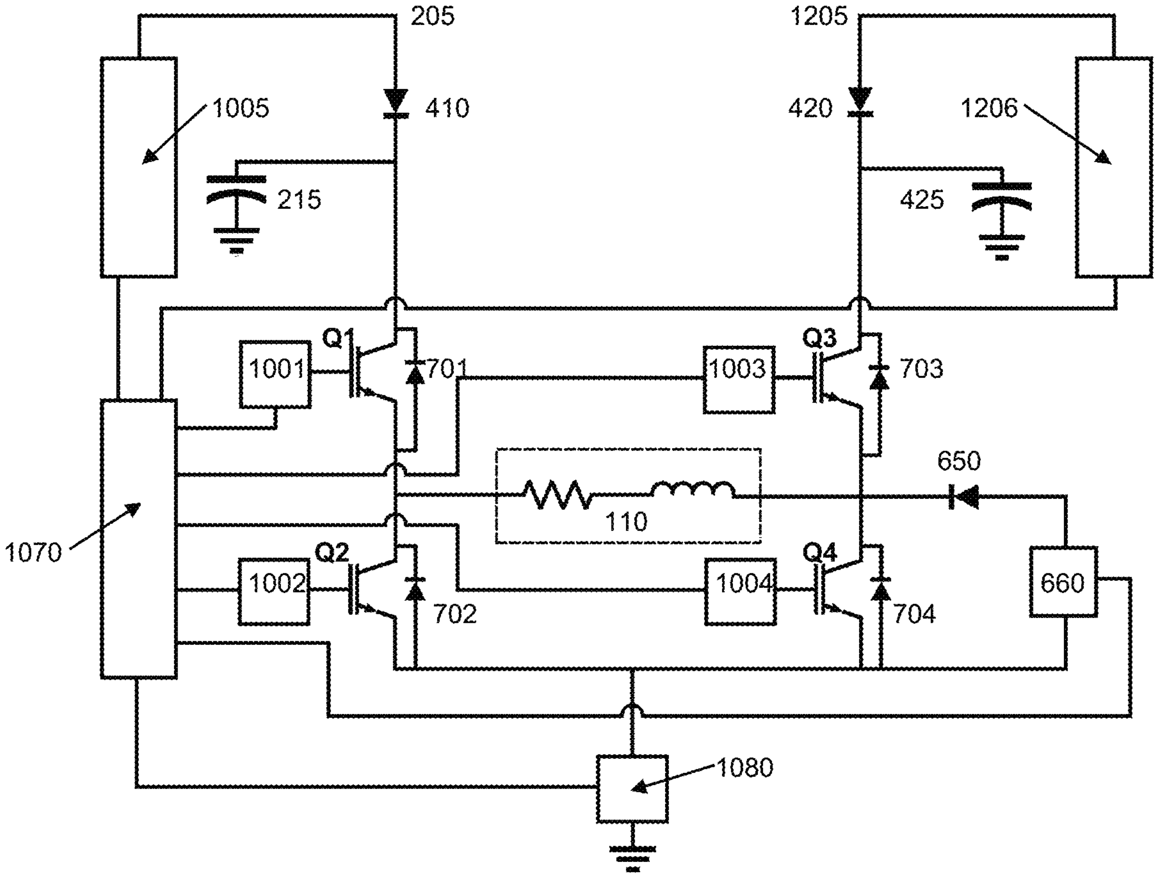
FIG. 12 is a block diagram of the control system for an H-bridge with isolated switch stacks and two different power buses, and a holding current source according to an embodiment.

FIG. 12 is a block diagram of the control system for an H-bridge with isolated switch stacks and two different power buses, and a holding current source according to an embodiment. In FIG. 12, high-voltage supply 1005 and power bus 205, which charges capacitor 215 through the diode 410, may be used for deactivation of the solenoid via the coil 110. For activation, there is a separate power bus 1205 and a separate high-voltage supply 1206 that charge the activation capacitor 425. With the two separate power buses, 205 and 1205, it is possible to address the activation of the solenoid with, as an example, a voltage of 800 volts, but exercise the deactivation with a lower voltage, as an example, 225 volts. This voltage flexibility, along with the ability to choose different capacitance values for the deactivation capacitor 215 and the activation capacitor 425, allows highly flexible adjustment of both the activation and deactivation energies and their rates of delivery.

With the power bus divided into activation 1205 and deactivation 205 arms, the isolating diodes 420 and 410 may no longer be needed. Thus, in the two-power bus case, those diodes may be eliminated unless they play a role in protecting the high-voltage power supplies 1206 and 1005 from the transient voltages arising during the solenoid transitions.

The foregoing disclosure has assumed that the power supply buses 205 and 1205 are operating at a positive voltage with respect to the system ground. The underlying principles can also be applied to systems employing negative power supply buses. The diodes and switching transistors would be inverted to provide the appropriate senses for the negative power supplies. Note that while the foregoing embodiments of the application include four switches Q1, Q2, Q3 and Q4, though any number of switches may be utilized in those embodiments.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A solenoid driver operable to drive a solenoid actuating a high-voltage power switch, the solenoid driver comprising:

a first plurality of semiconductor switches including a first semiconductor switch and a second semiconductor switch in series;

a second plurality of semiconductor switches including a third semiconductor switch and a fourth semiconductor switch in series;

a first diode in series with the first plurality of semiconductor switches, the first diode delivering current to the first plurality of semiconductor switches from a power bus, and providing isolation between the power bus and the first plurality of semiconductor switches;

a second diode in series with the second plurality of semiconductor switches, the second diode delivering current to the second plurality of semiconductor switches from the power bus, and providing isolation between the power bus and the second plurality of semiconductor switches; and a common connection between the first plurality of semiconductor switches and the second plurality of semiconductor switches;

wherein a solenoid coil of the solenoid is connected between the first plurality of semiconductor switches and the second plurality of semiconductor switches at a junction between the first and second semiconductor switches and a junction between the third and fourth semiconductor switches;

when the second and third semiconductor switches are on, activating current flows through the solenoid coil to activate the solenoid;

when the first and fourth semiconductor switches are on, deactivating current flows through the solenoid coil to deactivate the solenoid.

2. The solenoid driver of claim 1, wherein the first semiconductor switch and the second semiconductor switch form a first stack of semiconductor switches; and the third semiconductor switch and the fourth semiconductor switch form a second stack of semiconductor switches.

3. The solenoid driver of claim 1, wherein the common connection is connected to a ground.

4. The solenoid driver of claim 1, further comprising:

a first energy storage capacitor having one end connected between the second diode and the third semiconductor switch to supply the activating current to the solenoid coil, and another end connected to a ground; and a second energy storage capacitor having one end connected between the first diode and the first semiconductor switch to supply the deactivating current to the solenoid coil, and another end connected to the ground.

5. The solenoid driver of claim 4, wherein the first and second energy storage capacitors have different capacitance values from one another.

6. The solenoid driver of claim 1, further comprising a holding power source connected to the solenoid coil through an isolation diode;

wherein under a holding condition, the holding power source is configured to provide holding current that flows through the solenoid coil and to a ground when the second semiconductor switch is on and the first, third and fourth semiconductor switches are off.

7. The solenoid driver of claim 1, further comprising a current monitor disposed between the common connection and a ground;

wherein the current monitor is configured to sense a maximum allowable coil current, and interrupt current delivery to the solenoid coil when current through the solenoid coil reaches the maximum allowable coil current.

8. The solenoid driver of claim 1, wherein the first and second plurality of semiconductor switches comprise insulated gate bipolar transistors (IGBTs).

9. The solenoid driver of claim 1, wherein the first and second plurality of semiconductor switches comprise field effect transistors.

10. The solenoid driver of claim 4, further comprising:

a power supply configured to drive the power bus to charge the first and second energy storage capacitors; and a driver control system configured to control operations of the first and second plurality of semiconductor switches, and to turn the power supply on or off.

11. A solenoid driver operable to drive a solenoid actuating a high-voltage power switch, the solenoid driver comprising:

a first plurality of semiconductor switches including a first semiconductor switch and a second semiconductor switch in series;

a second plurality of semiconductor switches including a third semiconductor switch and a fourth semiconductor switch in series;

a common connection between the first plurality of semiconductor switches and the second plurality of semiconductor switches;

a first diode in series with the first plurality of semiconductor switches, the first diode connecting to a first power supply for deactivation of a solenoid coil of the solenoid and configured to deliver current to the first plurality of semiconductor switches from the first power supply; and a second diode in series with the second plurality of semiconductor switches, the second diode connecting to a second power supply for activation of the solenoid coil and configured to deliver current to the second plurality of semiconductor switches from the second power supply;

wherein the solenoid coil is connected between the first plurality of semiconductor switches and the second plurality of semiconductor switches at a junction between the first and second semiconductor switches and a junction between the third and fourth semiconductor switches;

when the second and third semiconductor switches are on, activating current flows through the solenoid coil to activate the solenoid;

when the first and fourth semiconductor switches are on, deactivating current flows through the solenoid coil to deactivate the solenoid.

12. The solenoid driver of claim 11, further comprising:

a first energy storage capacitor having one end connected between the second diode and the third semiconductor switch to supply the activating current to the solenoid coil, and another end connected to a ground; and a second energy storage capacitor having one end connected between the first diode and the first semiconductor switch to supply the deactivating current to the solenoid coil, and another end connected to the ground.

13. The solenoid driver of claim 12, wherein the first and second energy storage capacitors have different capacitance values from one another.

14. The solenoid driver of claim 11, wherein the first power supply delivers a voltage different from a voltage delivered by the second power supply.

15. The solenoid driver of claim 11, further comprising a holding power source connected to the solenoid coil through an isolation diode;

wherein under a holding condition, the holding power source is configured to provide holding current that flows through the solenoid coil and to a ground when the second semiconductor switch is on and the first, third and fourth semiconductor switches are off.

16. The solenoid driver of claim 11, further comprising a current monitor disposed between the common connection and a ground;

wherein the current monitor is configured to sense a maximum allowable coil current, and interrupt current delivery to the solenoid coil when current through the solenoid coil reaches the maximum allowable coil current.

17. The solenoid driver of claim 11, wherein the first and second plurality of semiconductor switches comprise insulated gate bipolar transistors (IGBTs).

18. The solenoid driver of claim 11, wherein the first and second plurality of semiconductor switches comprise field effect transistors.

19. The solenoid driver of claim 11, further comprising a plurality of driver circuits;

wherein each of the first, second, third and fourth semiconductor switches is connected to a driver circuit among the plurality of driver circuits to drive the semiconductor switch.

20. The solenoid driver of claim 19, further comprising a driver control system configured to control operations of the first and second plurality of semiconductor switches, and to turn the first and second power supplies on or off.

* * * * *